United States Patent
Chahrouri et al.

(10) Patent No.: US 6,944,601 B2
(45) Date of Patent: Sep. 13, 2005

(54) METHOD OF LICENSING SOFTWARE PROGRAMS

(75) Inventors: Najib Chahrouri, Karlsruhe (DE); Frederic Metrich, Strassburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/883,678

(22) Filed: Jul. 6, 2004

(65) Prior Publication Data

US 2005/0027554 A1 Feb. 3, 2005

Related U.S. Application Data

(63) Continuation of application No. PCT/DE02/04709, filed on Dec. 23, 2002.

(30) Foreign Application Priority Data

Jan. 4, 2002 (DE) .......................... 102 001 84

(51) Int. Cl.[7] ............................................... H04L 9/00
(52) U.S. Cl. .......................................... 705/59; 705/57
(58) Field of Search ........................ 705/57–59; 380/28

(56) References Cited

U.S. PATENT DOCUMENTS

| | | | | | |
|---|---|---|---|---|---|
| 5,553,139 A | * | 9/1996 | Ross et al. | ...................... | 705/59 |
| 5,613,004 A | * | 3/1997 | Cooperman et al. | .......... | 380/28 |
| 5,745,569 A | * | 4/1998 | Moskowitz et al. | .......... | 705/58 |
| 5,752,041 A | * | 5/1998 | Fosdick | ........................ | 705/59 |
| 5,805,699 A | * | 9/1998 | Akiyama et al. | .............. | 705/59 |
| 6,324,649 B1 | * | 11/2001 | Eyres et al. | ................... | 705/59 |
| 6,460,023 B1 | * | 10/2002 | Bean et al. | .................... | 705/59 |
| 6,801,999 B1 | * | 10/2004 | Venkatesan et al. | ........... | 705/59 |
| 2001/0011238 A1 | | 8/2001 | Eberhard et al. | | |

FOREIGN PATENT DOCUMENTS

| | | |
|---|---|---|
| WO | WO 98/04974 A1 | 2/1998 |
| WO | WO 02/01335 A2 | 1/2002 |

OTHER PUBLICATIONS

"Software Protection By Decryption on Multi–Usage Interface", IBM Tech. Discl. Bull., vol. 25, No. 5, pp–1939–1944(Oct. 1986).*

* cited by examiner

Primary Examiner—Salvatore Cangialosi
(74) Attorney, Agent, or Firm—Sughrue Mion, PLLC

(57) ABSTRACT

A method and a system for the combined licensing of one or more software programs (3) protected by a software protection (5), is provided. Each software protection (5) can be deactivated by a key (6). An additional software program (4) functions as a license manager (4), which has access to the key (6) or a key (6) for each software program protection. This license manager (4) can be licensed by a manager or master key (6). When the license manager (4) is licensed by the manager or master key (6), the license manager (4) deactivates the software protection (5) of a software program or software protection (5) for each of the software programs by means of the corresponding key (6).

20 Claims, 4 Drawing Sheets

5. - Software Protection
6. - Predefinable Key
51. - Comparator
52. - Stored Identifier 1 - Electrical Device
2 - Bus
3 - Software Program
4. - License Manager 3 - Software Program
5. - Software Protection 4. - License Manager
5. - Software Protection 5. - Software Protection
6. - Predefinable Key
51. - Comparator
52. - Stored Identifier 5. - Software Protection
7. - Database
8. - Instruction Sequence
9. - Instruction 3 - Software Program
4. - License Manager
5. - Software Protection
10. - Licensing Module

METHOD OF LICENSING SOFTWARE PROGRAMS

This is a Continuation of International Application PCT/DE02/04709, with an international filing date of Dec. 23, 2002, which was published under PCT Article 21(2) in German, and the disclosure of which is incorporated into this application by reference.

BACKGROUND OF THE INVENTION

1. Field of the Invention

The present invention relates to a method for licensing a software program and, more particularly, to a method for licensing one or more software programs protected by a software protection.

2. Description of the Related Art

The licensing of protected software programs is generally known. Personal computers used today, e.g., in office automation, can be efficiently used only in conjunction with a software program designed to run on them, e.g., a word processor. A software protection frequently protects such software programs against unauthorized use. This software protection is deactivated by entering an identifier, hereinafter referred to as key, which is unique for the authorized user and the corresponding software program. As long as the software protection is activated (that is, the authorized user did not deactivate the protection), the software program cannot be used or the software program can only be partially used, on the corresponding equipment. Thus, the deactivation of the software protection corresponds to a licensing of the respective software program.

The disadvantage of this prior-art method, however, is that the user must execute the licensing manually. Moreover, in order to license a number of software programs, the user must license each software program separately. The separate licensing steps required frequently differ for each software program. In addition, a separate key is provided for each software program to be licensed. A user who has successfully licensed a first software program, must still keep the respective key to license an additional software program. In addition, he or she must determine what steps have to be carried out for licensing and then individually execute these separate steps to license the software program by means of the associated key. For each software program to execute, the user must have an associated key. This procedure is complex and is susceptible to errors, especially for the inexperienced users.

OBJECTS OF THE INVENTION

Thus, one object of the invention is to provide a method suitable for licensing one or more software programs. In particular, it is an object of the present invention to provide a method for the combined licensing of a number of software programs, which obviates the above-described drawbacks. The software program or each software program is protected by a software protection. This software protection or the software protection of each of the software programs can be deactivated by a key.

Illustrative, non-limiting embodiments of the present invention may overcome the above disadvantages and other disadvantages not described above. The present invention is not necessarily required to overcome any of the disadvantages described above, and the illustrative, non-limiting embodiments of the present invention may not overcome any of the problems described above. The appended claims should be consulted to ascertain the true scope of the invention.

SUMMARY OF THE INVENTION

According to an exemplary non-limiting embodiment of the present invention, a method for licensing one or more software programs protected by a software protection is provided. In this method, one or more software programs with a software protection are deactivated by using one or more predefined keys. In this method an additional software program functioning as a license manager has access to one or more predefined keys, and the license manager is licensed by a master key. Furthermore, in this method, the licensing of the license manager by the manager key deactivates the software protection of one or more software programs through the use of one or more predefined keys.

According to another exemplary, non-limiting embodiment of the present invention, a license manager is provided as an additional software program. The license manager has access to each key required to license a software program. The license manager itself can be licensed by a key, hereinafter referred to as the manager key. Once the license manager is licensed by means of this manager key, the software protection or each software protection can be deactivated by the license manager using the corresponding key.

The method and the system in the illustrative, non-limiting embodiments is based on the knowledge that many of the software programs can be operated by a software control. Examples of such software controls are so-called macros or scripts. It is also feasible to call individual functionalities of the software program directly, e.g., those for licensing the program, via provided software interfaces of the software program. Such a direct call of a special functionality requires a suitable software architecture, which can be readily obtained, particularly through consistent use of so-called object-oriented programming.

It is an object of the present invention, to automate the licensing process, thereby relieving the user from having to use procedures that are unfamiliar and therefore time-consuming and susceptible to errors. In addition, it is an object of the present invention to combine the licensing of a number of software programs.

According to the illustrative, non-limiting embodiment of the present invention, if the license manager accesses an instruction sequence with one or more instructions stored in a datastore to deactivate a corresponding software protection, the licensing manager can be flexibly adapted to a wide variety of software programs with possibly different software protections. To deactivate the software protection of a first software program or a first type of software programs, the database contains an associated first instruction sequence. Correspondingly, to deactivate the software protection of a second or third software program or a second or third type of software programs, and so on, the database contains additional instruction sequences.

According to the illustrative, non-limiting embodiment of the present invention, this instruction or each instruction is advantageously an instruction of a so-called script language or a so-called macro language. Instructions in a script or macro language are frequently written in a syntax understandable to the inexperienced user, so that the user can even intervene manually in the instruction sequences to make adaptations where required. Furthermore, instructions in a script or macro language are typically stored in ASCII code and can therefore be displayed and edited without further conversion operations. Among other advantages, this facilitates their transfer, so that the instruction sequences for the license manager can also be adapted or supplemented via the Internet, for example.

According to another illustrative, non-limiting embodiment of the present invention, the license manager is advantageously configured to receive at least one interchangeable licensing module. In this case, to carry out the method, the appropriate type and number of such licensing modules required to deactivate each software protection are integrated into the license manager. Each licensing module either includes the suitable instruction sequences for deactivating at least one software protection or, according to another advantageous embodiment, directly accesses a datastore where instruction sequences with at least one instruction are stored.

BRIEF DESCRIPTION OF THE DRAWINGS

The above and other features and advantages of the present invention will become more apparent by describing in detail illustrative, non-limiting embodiments thereof with reference to the attached drawings in which.

DETAILED DESCRIPTION OF THE PREFERRED EMBODIMENTS

Figure 1:
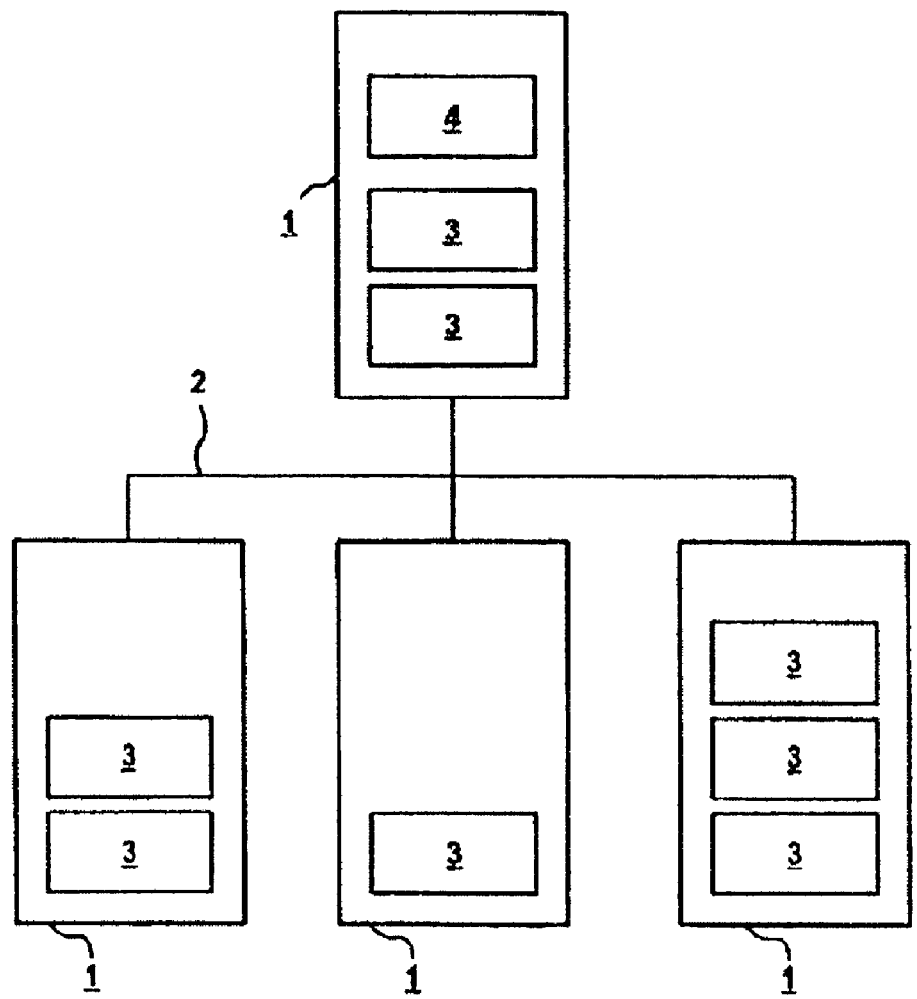
FIG. 1 shows a number of electrical devices interconnected for communication, with a software program installed on each.

The present invention will now be described in detail by describing illustrative, non-limiting embodiments thereof with reference to the accompanying drawings. In the drawings, the same reference characters denote the same elements.

FIG. 1 shows a number of electrical devices 1 interconnected with each other for communication. To this end, each electrical device 1 is connected to a bus 2. The bus 2 serves as a communication line connecting each electrical device 1 with all the other electrical devices 1.

Each electrical device 1 has one or more software program 3 available. The software program or each software program 3 is stored in the corresponding electrical device 1 in a manner well known to one of ordinary skill in the art. The software program 3 can be stored in various locations as is well known in the art, e.g., in a so-called non-volatile memory (not depicted) such as a diskette, a hard disk and so on, or in a volatile memory (likewise not depicted) such as the main memory and so on.

An additional software program 4, which functions as a license manager 4, is provided in one of the electrical devices 1. The license manager 4 serves to license some or all software programs 3. The licensing is independent of whether the software program(s) is/are stored in the same electrical device 1 as the license manager 4 or in a remote electrical device 1 from the license manager 4.

Figure 2A:
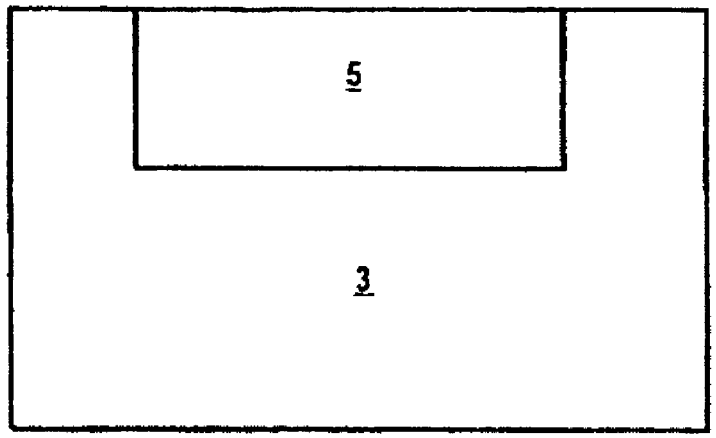
FIGS. 2a, 2b show a software program and a license manager, each protected by a software protection.
Figure 2B:
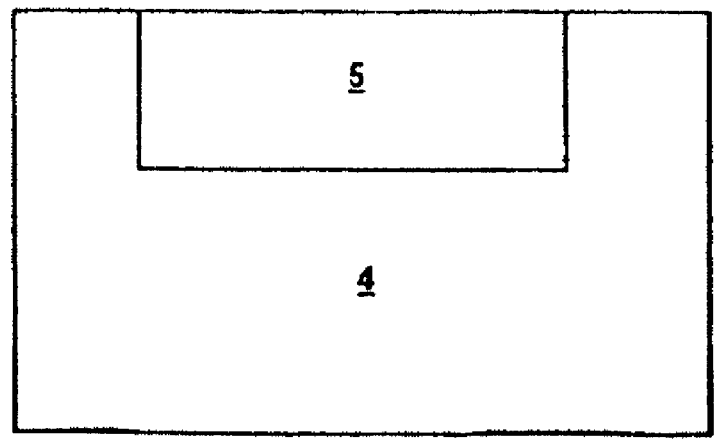

FIGS. 2a, 2b show a software program 3 and the license manager 4, respectively, each protected by the software protection 5.

Figure 3:
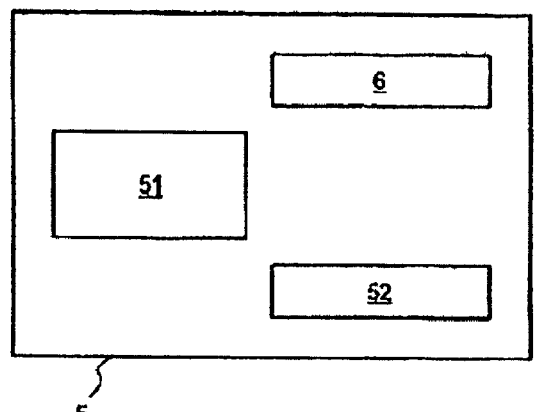
FIG. 3 illustrates the software protection.

FIG. 3 illustrates the basic functionality of the software protection 5. Accordingly as illustrated in FIG. 3, the software protection 5 has a comparator 51, which compares a stored identifier 52 with a predefinable key 6. In the conventional methods, a user enters the key 6, or a software program 3 reads it in from a storage medium to be provided by the user (e.g., a diskette or a so-called dongle). If the identifier 52 and the key 6 match, particularly if the identifier 52 and the key 6 coincide, the corresponding software program is considered properly licensed and the software protection 5 is deactivated.

When the software protection 5 is deactivated, the software program can be operated for at least a predefined number of calls, or for a predefined time interval, without re-entering the key 6. Depending on the design of the underlying algorithm, however, the deactivation of the software protection 5 can be, for example, incremental. Accordingly, a first key 6 matching another identifier 52 would cause the deactivation of the software protection 5 for a first group or category of functions of the software program 3. A second key 6 matching the second identifier 52 would cause the deactivation of the software protection 5 of a second, additional group or category of functions of the software program 3. Alternatively, a first key 6 matching the identifier 52 would cause the deactivation of the software protection 5 for a first time interval. A second key 6 matching the identifier 52 would correspondingly cause the deactivation of the software protection 5 for a second, additional time interval. One of ordinary skill in the art would readily recognize that other variations such as having additional keys for additional functions of the software program 3, for additional time interval, or both, are possible and are within the scope of the invention.

As mentioned above, to license a software program 3, an associated key 6 is provided. Entering the key 6 deactivates the software protection 5 for this software program 3. The license manager may also have software protection 5. Thereby, to license the license manager 4, a separate manager or master key 6 is provided. The licensing of the license manager 4 by using the manager or master key 6 deactivates the software protection, or each software protection 5, of each software program 3 through the respectively associated key. For example, the user simply provides the manager or master key 6 to the license manager 4, and this deactivates the protection on the license manager 4. The license manager 4 has a predefined key 6 for each software program 3 so as to deactivate software protection 5 of each software program 3.

Figure 4:
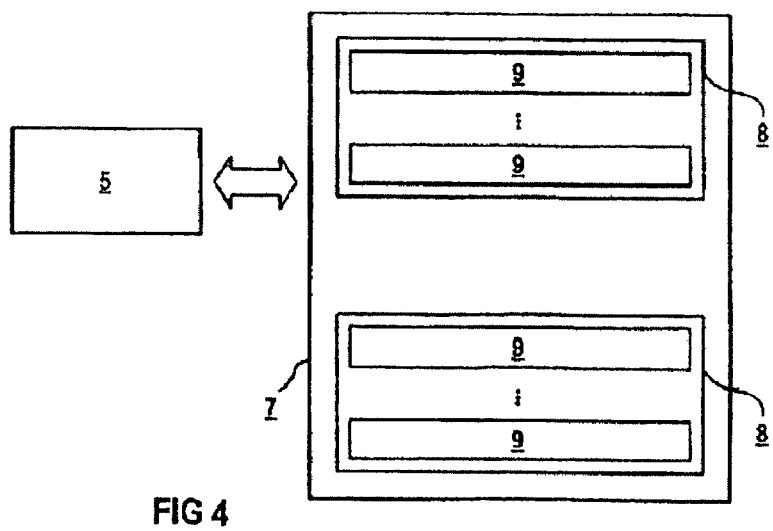
FIG. 4 shows a database accessed by the license manager.

FIG. 4 shows a database 7 to which the license manager 4 has access (not shown). One or more instruction sequences 8 are stored in this database 7. Each instruction sequence 8 includes one or more instructions 9. The license manager 4, as a function of the software protection 5 to be deactivated, fetches a suitable instruction sequence 8 or, successively, its instructions 9 from the database 7 and executes them. The instruction or each instruction 9 is, for example, an instruction of a so-called script language or an instruction 9 of a so-called macro language. In this manner, the license manager 4 can deactivate the software protection 5 of a wide variety of software programs 3. The license manager 4 either fetches the required key 6 from the database 7 or receives the key 6 through manual entry. The license manager 4 detects the key 6 and the instruction sequence 8 to be used to license a given software program 3 either by the key 6 itself or by additional criteria which are linked to the key and, in particular, are entered manually.

Figure 5:
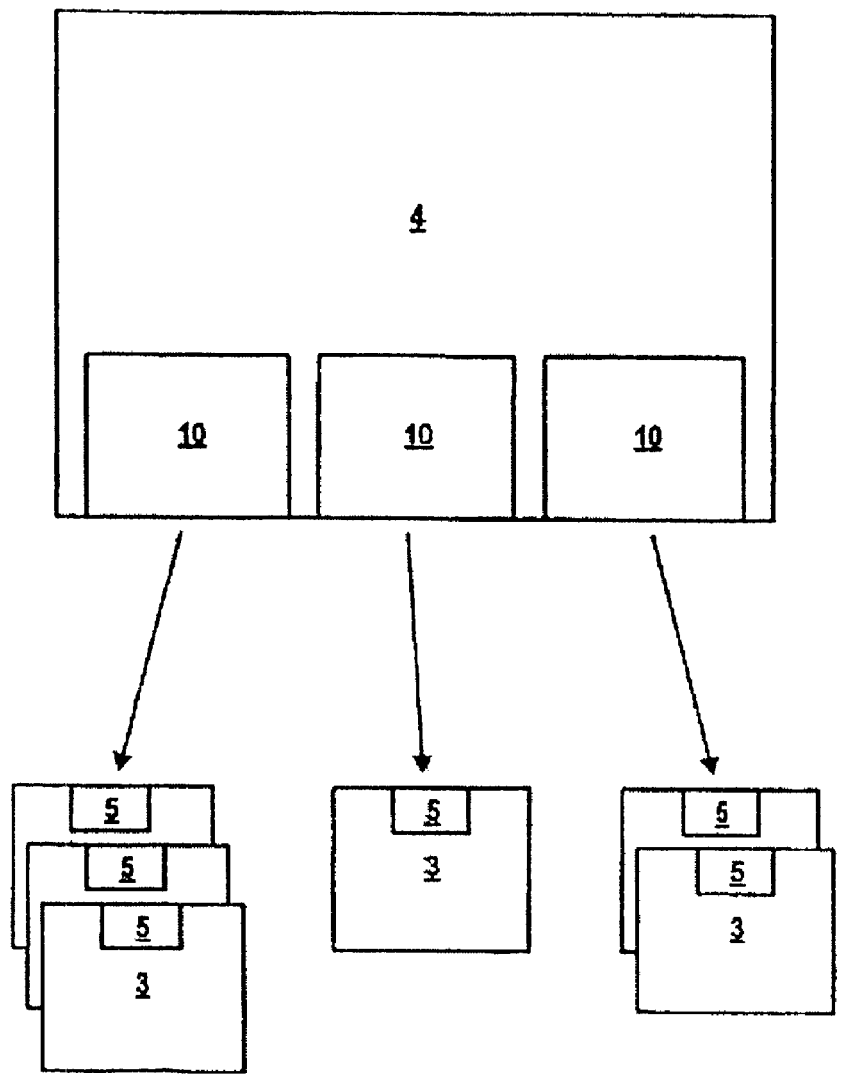
FIG. 5 shows an embodiment of the license manager with interchangeable licensing modules.

FIG. 5 shows another illustrative, non-limiting embodiment of the license manager 4. In this exemplary embodiment, the license manager 4 is adapted to receive at least one interchangeable licensing module 10. Each licensing module 10 is intended and adapted to deactivate the software protection 5 of one or more software programs 3, as illustrated by the arrows in FIG. 5. If there is a number of software programs, which are identical or sufficiently similar regarding the type and manner of the deactivation of their respective software protection 5, a single licensing module 10 may be provided for their licensing. To deactivate the software protection 5 of each and every software program 3 executed by the device or each device 1, an appropriate type and number of such licensing modules 10 is integrated into the license manager 4.

Unless the licensing module 10 already contains the corresponding information, the licensing module or each licensing module 10 accesses, for example, the instruction sequences 8, each with at least one instruction 9 stored in a database 7 (as opposed to the illustrative embodiment in FIG. 4) to deactivate a corresponding software protection 5. Such instruction sequences 8 or their functional equivalents may also be stored directly in the corresponding licensing module 10.

Thus, the illustrative, non-limiting embodiments of the present invention can be summarized as follows:

A method is disclosed which is suitable, in particular, for the combined licensing of a number of software programs 3 protected by a software protection 5. A key 6 can deactivate each software protection 5. A license manager 4 has access to the key, or to each key 6. The license manager 4 can also have software protection 5. In this case, the license manager 4 will have to be licensed by a separate manager or master key 6. By using the manager or master key 6 to license the license manager 4, the software protection or each software protection 5 is deactivated by means of the license manager 4 through the corresponding associated keys 6.

The above description of the illustrative, non-limiting embodiments has been given by way of an example. The above and other features of the invention including various novel method steps and a system of the various modules have been particularly described with reference to the accompanying drawings and pointed out in the claims. It will be understood that the particular process and construction of logical parts embodying the invention is shown by way of illustration only and not as a limitation of the invention. The principles and features of this invention may be employed in varied and numerous embodiments without departing from the scope of the invention as defined by the appended claims.

What is claimed is:

1. A method for licensing at least one software program protected by a software protection, the method comprising:
   deactivating said software protection of said at least one software program, by using at least one predefined key, wherein:
   an additional software program functioning as a license manager has access to said at least one predefined key,
   said license manager is licensed by a master key, and
   the licensing of said license manager by said master key deactivates said software protection of said at least one software program through said at least one predefined key.

2. The method as claimed in claim 1, wherein said license manager accesses at least one instruction sequence, each of said at least one instruction sequence comprises at least one instruction stored in a datastore to deactivate said software protection of said at least one software program.

3. The method as claimed in claim 2, wherein said at least one instruction is in a script language.

4. The method as claimed in claim 2, wherein said at least one instruction is in a macro language.

5. The method as claimed in claim 1, wherein said license manager is adapted to receive at least one interchangeable licensing module and wherein a type and number of said at least one interchangeable licensing module required to deactivate software protection of each of said at least one software program is integrated into said license manager.

6. The method as claimed in claim 5, wherein said at least one licensing module accesses at least one instruction sequence, each of said at least one instruction sequence comprises at least one instruction stored in a datastore, to deactivate said software protection of said at least one software program.

7. The method as claimed in claim 2, wherein said license manager is adapted to receive at least one interchangeable licensing module and wherein a type and number of said at least one interchangeable licensing module required to deactivate software protection of each of said at least one software program is integrated into said license manager.

8. The method as claimed in claim 1, wherein the licensing of the license manager, by the master key, deactivates a protection on the license manager.

9. A method for licensing at least one software program protected by a software protection, the method comprising:
   providing an additional software program functioning as a license manager, wherein the license manager has access to at least one predefined key;
   licensing said license manager via a master key, and
   deactivating said software protection of said at least one software program, by using said at least one predefined key.

10. The method as claimed in claim 9, wherein the licensing of the license manager, via the master key, deactivates a protection on the license manager.

11. A computer system adapted for licensing at least one software program protected by a software protection, the system comprising:
   a processor, and
   a memory comprising software instruction adapted to enable the computer system to perform the steps of:
   deactivating software protection on a license manager by using a master key; and
   said license manager deactivates at least one software program with a software protection,
   wherein for each software program to license from said at least one software program, said license manger provides a respective predefined key to said software protection of each of said software program to license.

12. A computer system for licensing at least one software program protected by a software protection, the system comprising:
   a plurality of software programs, each with a software protection;
   a license manager, licensed by a master key, that deactivates said software protection for each of said plurality software programs;
   a plurality of predefinable keys,
   wherein said license manager obtains said plurality of predefined keys and supplies to said software protection for each of said plurality of software programs a corresponding predefined key from said plurality of keys.

13. The computer system according to claim 12, wherein the licensing of the license manager, by the master key, deactivates a protection on the license manager.

14. The computer system according to claim 12, wherein said corresponding predefinable key supplied by said license manager is compared with an identifier in said software protection.

15. The computer system according to claim 12, wherein said license manager has a software protection disabled with a master key, and wherein when said software protection of the license manager is deactivated, the license manager deactivates the software protection for each of said plurality of software programs.

16. The system according to claim 12, wherein said license manager accesses at least one instruction sequence, each of said at least one instruction sequence comprises at least one instruction to deactivate said software protection of said at least one software program.

17. The system according to claim 16, wherein said at least one instruction sequence comprises a first instruction sequence to deactivate a first type of software programs, and a second instruction sequence to deactivate a second type of software programs, and wherein said first and second instruction sequences are stored in a database.

18. The system according to claim 12, wherein said at least one instruction is written in a script language or in a macro language.

19. The system according to claim 12, wherein said license manager receives at least one licensing module and wherein a type and a number of said at least one licensing module required to deactivate software protection of each of said at least one software program is integrated into said license manager.

20. The method according to claim 19, wherein said at least one licensing module accesses at least one instruction sequence, each of said at least one instruction sequence comprises at least one instruction, to deactivate said software protection of said at least one software program.

* * * * *